No. 782,134. PATENTED FEB. 7, 1905.
W. S. HORRY.
ASYMMETRIC SHUNT FOR DIRECT CURRENT ELECTRIC CIRCUITS
OF HIGH INDUCTANCE.
APPLICATION FILED OCT. 29, 1904.

Witnesses:
R A Balduson
Julia B Hill

Inventor:
William Smith Horry,
by Byrnes & Townsend,
Att'ys.

No. 782,134.

Patented February 7, 1905.

UNITED STATES PATENT OFFICE.

WILLIAM SMITH HORRY, OF NIAGARA FALLS, NEW YORK.

ASYMMETRIC SHUNT FOR DIRECT-CURRENT ELECTRIC CIRCUITS OF HIGH INDUCTANCE.

SPECIFICATION forming part of Letters Patent No. 782,134, dated February 7, 1905.

Application filed October 29, 1904. Serial No. 230,598.

*To all whom it may concern:*

Be it known that I, WILLIAM SMITH HORRY, a citizen of the United States, residing at Niagara Falls, in the county of Niagara and State of New York, have invented certain new and useful Improvements in Asymmetric Shunts for Direct-Current Electric Circuits of High Inductance, of which the following is a specification.

When an electric circuit containing an inductance and carrying a direct current is interrupted, the inductance generates an electromotive force in the same direction as the applied electromotive force. When the inductance and the applied electromotive force are high, the secondary electromotive force due to a sudden rupture of the circuit may be so great as to endanger the insulation of the circuit and form an arc at the break. In order to furnish a path for the current due to such secondary electromotive force, it has been proposed to shunt the inductance with a local circuit containing a secondary battery, a condenser, or a resistance. Each of expedients has obvious disadvantages.

According to the present invention the inductance is provided with an asymmetric shunt, preferably an electrolytic cell.

Figure 1:
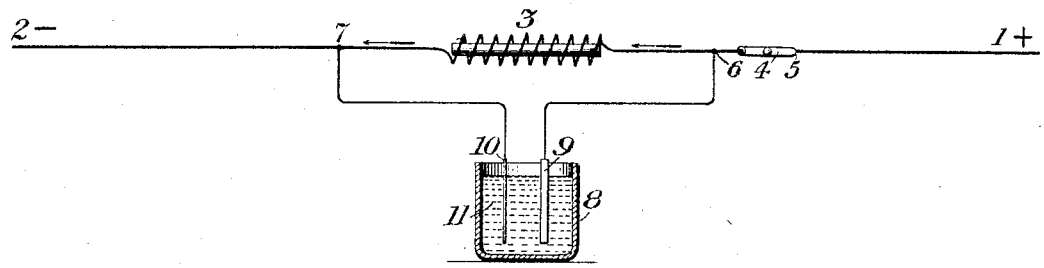
Figure 2:
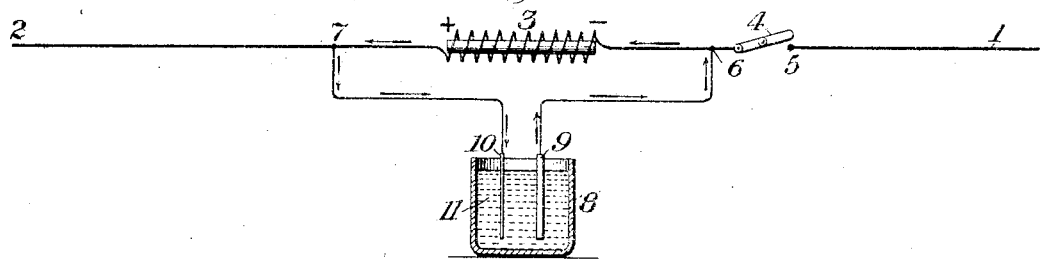

In the accompanying drawings, Figure 1 is a diagrammatic view of a main circuit containing an inductance, a shunt-circuit containing an asymmetric cell, and a switch closing the main circuit. Fig. 2 is a view of the same circuits with the switch open, and Fig. 3 is a view of similar circuits with a modified form of switch.

In the figures the numerals 1 2 indicate a main circuit containing an inductance 3—for example, an electric motor. A switch 4, having a contact 5, is arranged to open or close the main circuit. A shunt-circuit extends between points 6 7 at each side of the inductance 3. The shunt-circuit contains a device 8, which will substantially prevent the passage of the current carried by the main circuit, but will freely permit the passage of current in the opposite direction. The device shown is an asymmetric electrolytic cell which may consist of an electrode 9, of aluminium, and an electrode 10, of lead, in an electrolyte 11, which may be an aqueous solution of potassium phosphate or of citric or sulfuric acid.

In Fig. 1 the arrows indicate a direct current flowing from right to left through the inductance 3. The asymmetric cell 8 substantially prevents any flow of current through the shunt-circuit. When the switch 4 is opened, as shown in Fig. 2, the current due to the secondary electromotive force generated in the inductance flows freely through the shunt-circuit in the direction of the arrows, passing from the lead electrode 10 through the electrolyte to the aluminium electrode 9. This low-resistance path for the secondary current entirely prevents injury to the insulation of the inductance and arcing at the switch.

Figure 3:
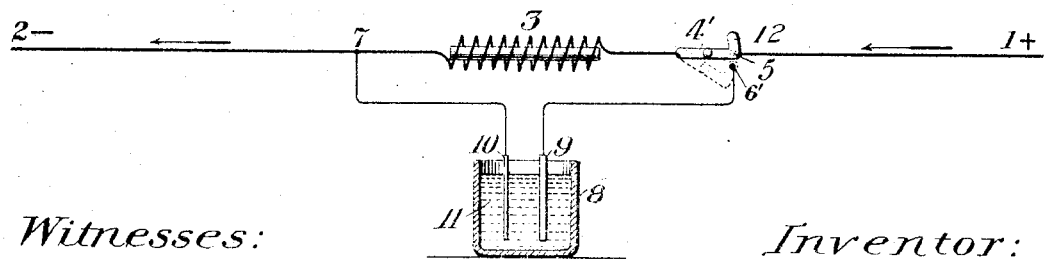

In the modified arrangement shown in Fig. 3 the shunt-circuit extends between a switch-contact 6' at one side of the inductance 3 and a point 7 in the main circuit at the other side of the inductance. The switch 4' has an arc-shaped contact end 12 of sufficient length to bridge the main contact 5 and the shunt-contact 6'. When the switch is in its normal position, (indicated by full lines,) the main circuit is closed and the shunt-circuit is open. When the switch is thrown into the position indicated by dotted lines, it first passes onto the contact 6', closing the shunt-circuit, and then off the contact 5, opening the main circuit. It is desirable to use this modified switch when the inductance 3 must remain in circuit for considerable periods, since the asymmetric cell is normally out of circuit and there is no loss of current or injury to the cell, which might be occasioned by slow or accidental leakage through it.

I claim—

1. A direct-current electric circuit, comprising a main circuit containing an inductance, a switch controlling said circuit, and an asymmetric shunt-circuit arranged to furnish a discharge-path for the current generated in the inductance when the switch is opened, as set forth.

2. A direct-current electric circuit, comprising a main circuit containing an inductance, a switch controlling said circuit, and a shunt-circuit containing an asymmetric electrolytic cell arranged to furnish a discharge-path for the current generated in the inductance when the switch is opened, as set forth.

3. A direct-current electric circuit, comprising a main circuit containing an inductance, an asymmetric shunt-circuit around the inductance, and a switch arranged to first close the shunt-circuit and then open the main circuit, as set forth.

4. A direct-current electric circuit, comprising a main circuit containing an inductance, a shunt-circuit around the inductance containing an asymmetric electrolytic cell, and a switch arranged to first close the shunt-circuit and then open the main circuit, as set forth.

In testimony whereof I affix my signature in presence of two witnesses.

WILLIAM SMITH HORRY

Witnesses:
MERLIN WILEY,
FRANK P. SULLIVAN.